United States Patent [19]

House

[11] Patent Number: 5,638,953
[45] Date of Patent: Jun. 17, 1997

[54] MAGAZINE INSERT HOLDER FOR COMPACT DISK

[75] Inventor: Richard F. House, St. Charles, Ill.

[73] Assignee: Jefferson Smurfit Corporation, Clayton, Mo.

[21] Appl. No.: 636,124

[22] Filed: Apr. 22, 1996

[51] Int. Cl.[6] .................................................. B65D 85/57
[52] U.S. Cl. ...................... 206/308.1; 206/232; 206/312; 229/68.1; 283/56
[58] Field of Search ...................................... 206/232, 312, 206/313, 472, 308.1; 229/68.1, 71; 283/56

[56] References Cited

U.S. PATENT DOCUMENTS

| | | | |
|---|---|---|---|
| 1,682,167 | 8/1928 | Deutschmeister | 229/68.1 |
| 2,344,437 | 3/1944 | Lande | 206/232 |
| 3,556,391 | 1/1971 | Kosterka | 206/312 |
| 4,905,831 | 3/1990 | Bagdis et al. | 206/313 |
| 5,188,229 | 2/1993 | Bernstein | 206/312 |
| 5,333,728 | 8/1994 | O'Brien et al. | 206/312 |
| 5,419,433 | 5/1995 | Harrer et al. | 206/312 |
| 5,460,265 | 10/1995 | Kiolbasa | 206/312 |

*Primary Examiner*—Jimmy G. Foster
*Attorney, Agent, or Firm*—Richard W. Carpenter

[57] ABSTRACT

A paperboard compact disk holder made in the form of a magazine insert. The holder includes front and rear panels, joined to each other to form a disk receiving pocket, and an advertising panel, which, along with the rear panel is detachably joined to one or more binding panels adapted to be bound in the spine of a magazine or similar article.

11 Claims, 4 Drawing Sheets

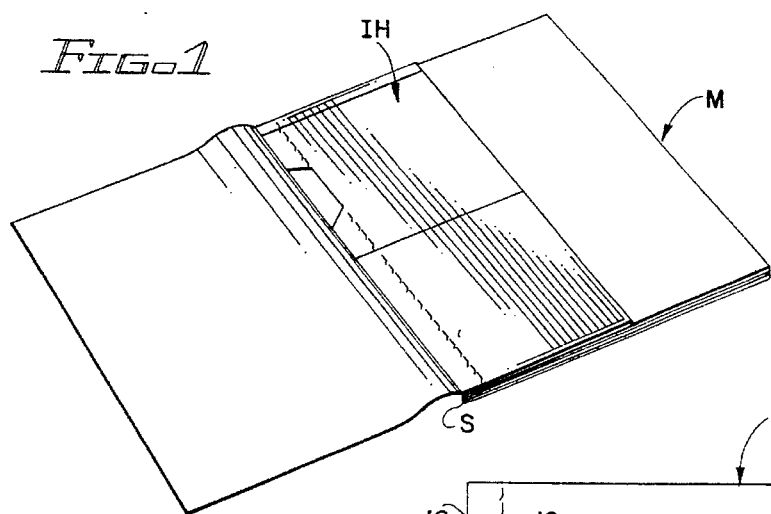
FIG. 1
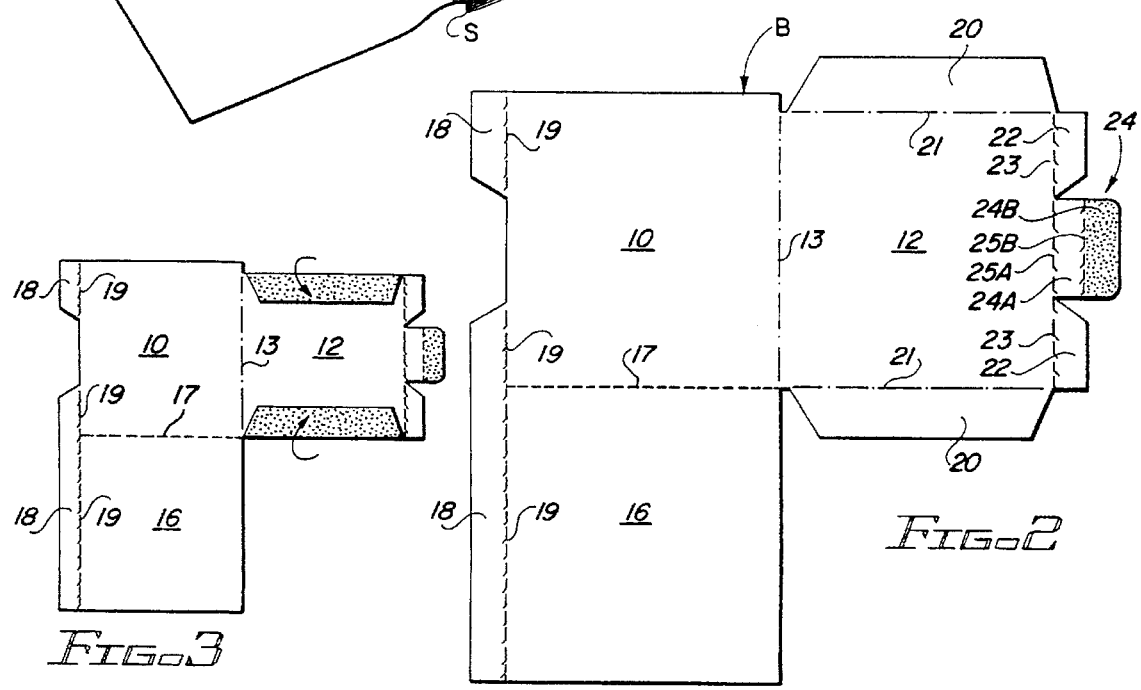
FIG. 2
FIG. 3
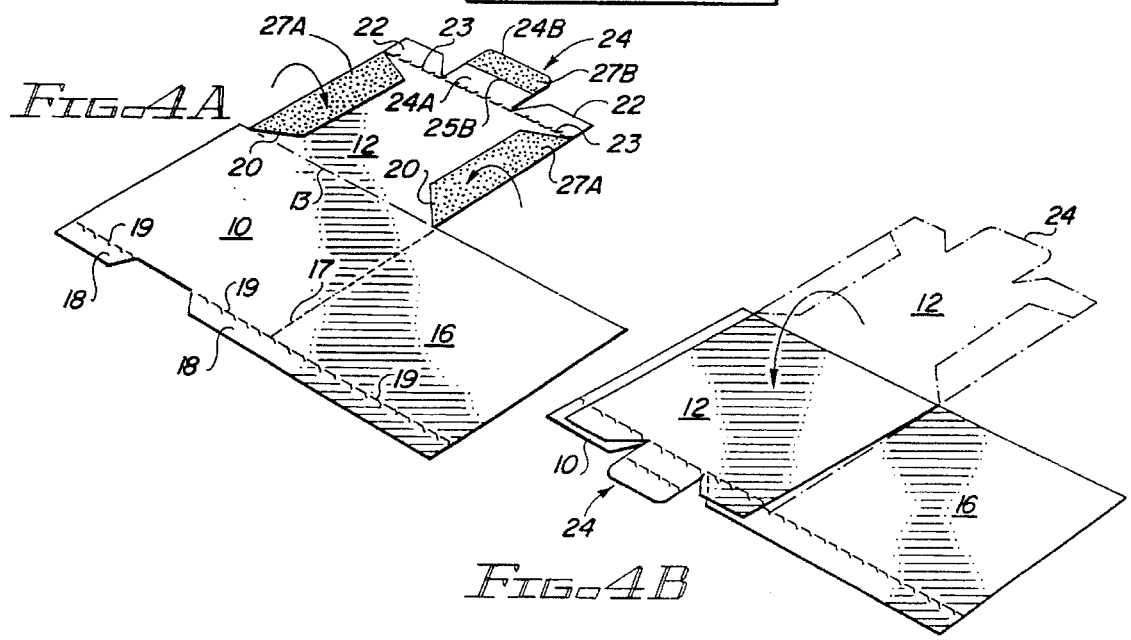
FIG. 4A
FIG. 4B

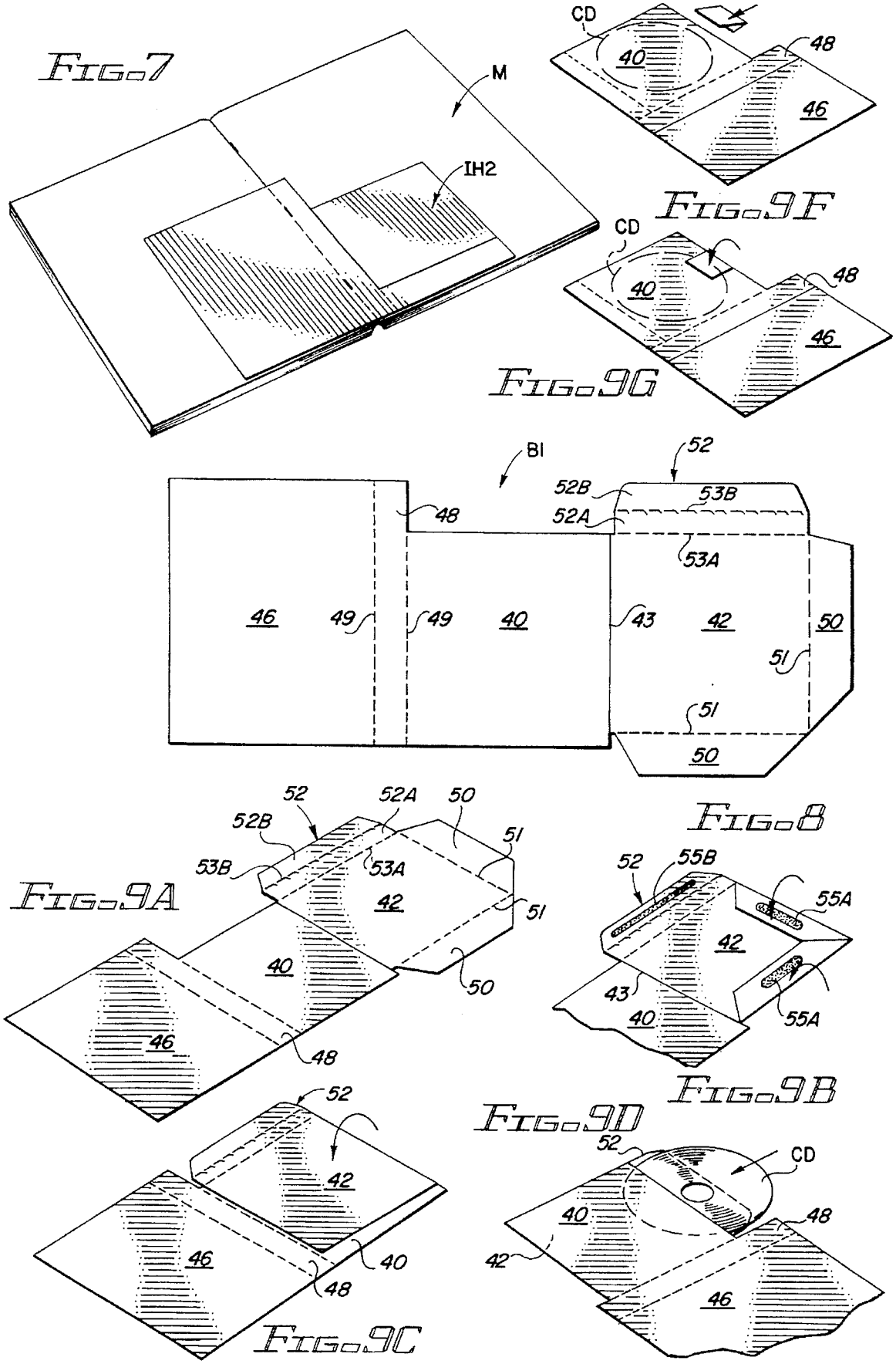

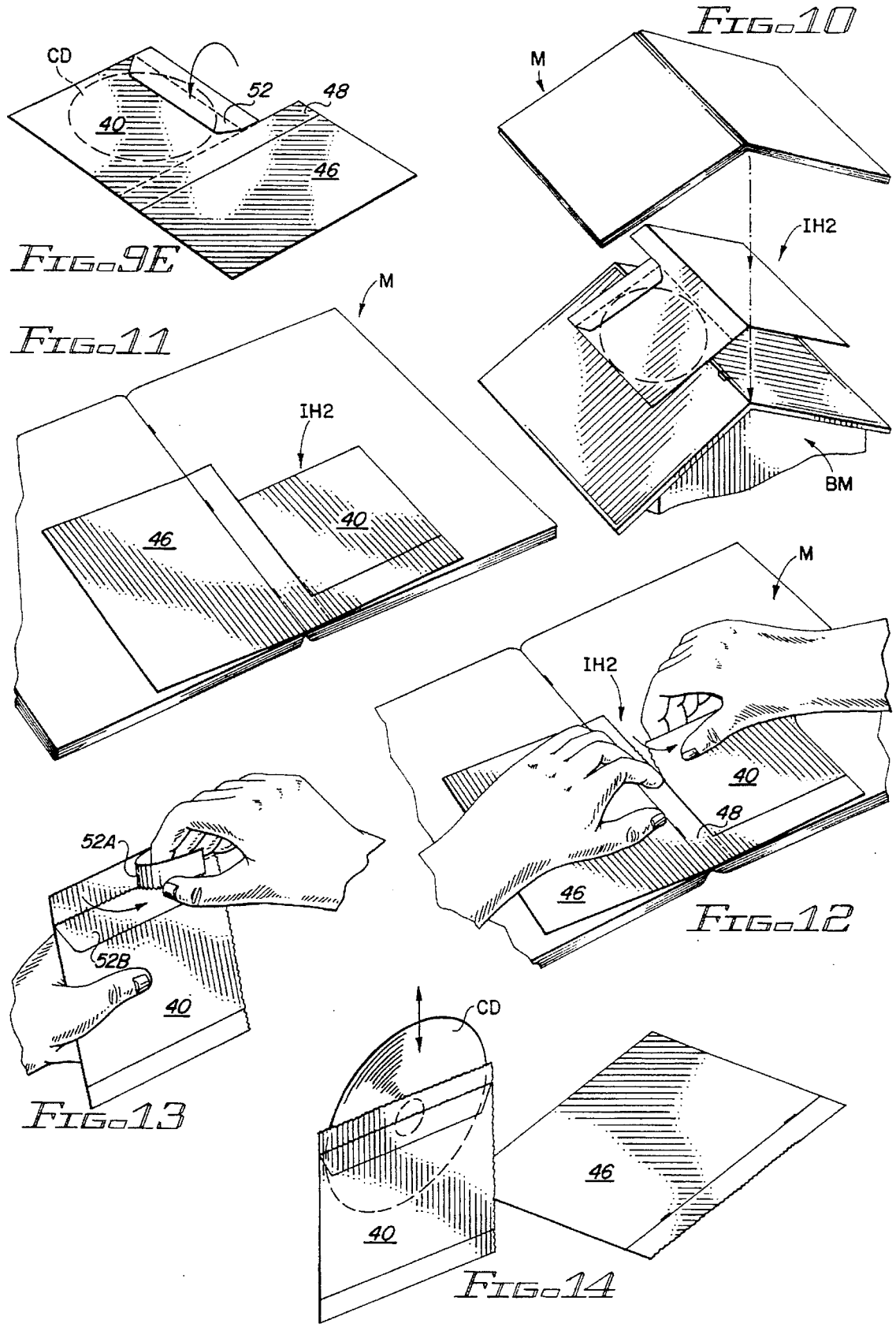

MAGAZINE INSERT HOLDER FOR COMPACT DISK

BACKGROUND OF THE INVENTION

1. Field of the Invention

This invention relates to packaging for compact disks, and more particularly to a compact disk holder in the form of a detachable paperboard insert adapted to be bound into a magazine, book, or similar article.

2. Description of the Background Art

A background art search directed to the subject matter of this invention conducted in the United States Patent and Trademark Office disclosed the following United States Letters Patent:

| | | | |
|---|---|---|---|
| 893,202 | 1,436,885 | 2,145,500 | 3,159,329 |
| 3,164,317 | 3,278,015 | 3,369,7322 | 4,905,831 |
| 5,098,127 | 5,269,563 | 5,318,222 | 3,560,025 | and French Patent 2,554,422

None of the patents uncovered in the search discloses a paperboard magazine insert compact disk holder including front and rear panels, forming a pocket, and an advertising panel, wherein the advertising and rear panels are each detachably joined to a binding panel which is adapted to be bound into the spine of a magazine, book, or similar article.

SUMMARY OF THE INVENTION

It is a primary object of the invention to provide a paperboard insert-type compact disk holder adapted to be and bound in a magazine or similar article and be detachable therefrom.

A more specific object of the invention is the provision of a compact disk holder of the type described that includes front and rear panels forming a pocket and an advertising panel, which, along with the rear panel is detachably joined to one or more binding panels adapted to be bound into the spine of a book, magazine, or similar article, These and other objects of the invention will be apparent from an examination of the following description and drawings.

BRIEF DESCRIPTION OF THE DRAWINGS

FIG. 1 is an isometric view of a paperboard compact disk holder shown as an insert secured within a magazine;

FIG. 2 is a plan view of a paperboard blank from which the compact disk holder illustrated in FIG. 1 may be formed;

FIG. 3 is a view similar to that of FIG. 2, but reduced in size and showing the blank with the side glue flaps folded over 180 degrees onto the front panel prior to attachment to the rear panel.

FIG. 4A is an isometric view of the structure illustrated in FIG. 3;

FIGS. 4B–4D are isometric views of the structure illustrated in FIG. 4A, showing various steps in the assembly of the holder, the insertion of the compact disk to be packaged, and the closure of the pocket by the closure flap;

FIGS. 7 and 8 are views similar to those of FIGS. 1 and 2, respectively, but illustrate a modified form of the invention;

FIGS. 9A–9E are isometric views illustrating various steps required to form the holder from the blank illustrated in FIG. 8;

FIGS. 9F and 9G are views similar to that of FIG. 4E, but show a modified form of the invention;

FIG. 10 is an exploded isometric view showing the insertion of the holder into a magazine;

FIG. 11 is an isometric view showing the insert holder in bound into the spine of a magazine;

FIG. 12 is a view similar to that of FIG. 11, but showing the detachment and removal of the insert holder from a magazine;

FIGS. 13 and 14 are isometric views of the insert holder showing the detachment of the pocket closure flap and the removal of the compact disk from the holder.

Figure 4C:
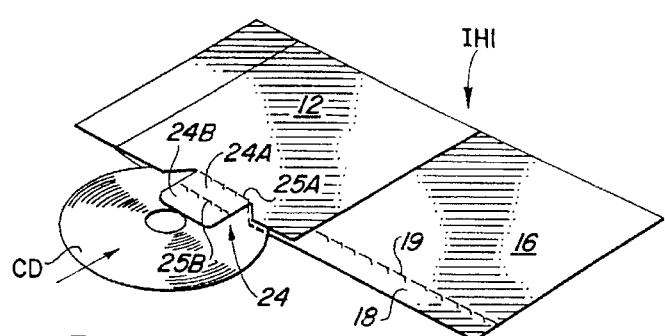
Figure 4D:
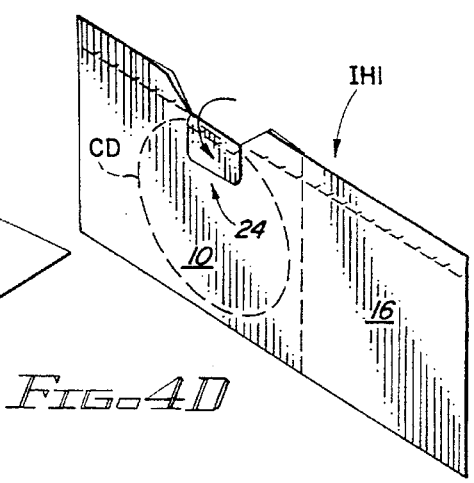

It will be understood that, for purposes of clarity, certain elements may have been omitted from certain views where they are believed to be illustrated to better advantage in other views.

DESCRIPTION OF THE PREFERRED EMBODIMENT

Referring now to the drawings for a better understanding of the invention, it will be seen that the compact disk insert holder, indicated at IH in FIG. 1, is shown bound in the spine S of a magazine M.

The holder may be formed from the unitary blank B of foldable sheet material, such as paperboard, illustrated in FIG. 2.

As best seen in FIG. 2, holder IH includes a rear panel 10, a front panel 12, and an advertising panel 16, all of which are preferably square and of substantially the same size.

Advertising panel 16 is foldably joined, along a perforated line of tear 17, to an adjacent side edge of rear panel 10.

Figure 6:
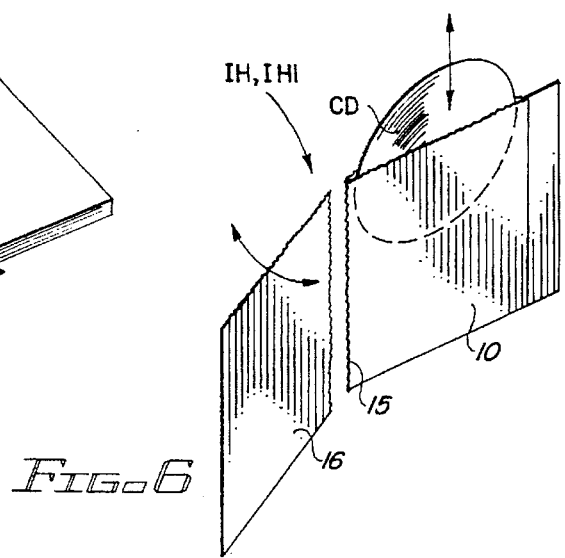
FIG. 6 is an isometric view of the holder insert, shown after it has been removed from a magazine, and illustrating the removal of a compact disk from the holder.

Front panel 12 is foldably joined at a side edge to an adjacent side edge of rear panel 10, along a fold line 13, and is folded over 180 degrees on top of rear panel to form a pocket 15 therebetween for holding a compact disk CD as seen in FIG. 6.

Figure 5:
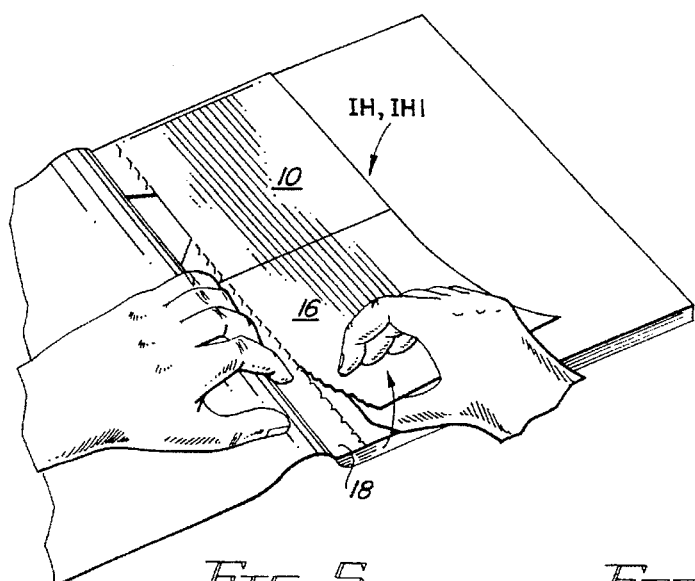
FIG. 5 is a view similar to that of FIG. 1, but showing how the holder insert is removed from a magazine.

Aligned side edges of advertising panel 16 and rear panel 10 are detachably joined, along weakened lines of tear 19 to relatively narrow strips or binding panels 18 that are adapted to be bound into the spine S of a magazine M or similar article, as shown in FIGS. 1 and 5.

A pair of glue flaps 20 are foldably joined, along fold lines 21, to opposed side edges of front panel 12. As best seen in FIGS. 3 and 4A–4D, glue flaps 20 are folded inwardly 180 degrees, on fold lines 21, and are adhesively secured to the front surface of rear panel 10. The adhesive patterns are indicated at 27a.

Detachably joined to front panel 12, along weakened lines of tear 23, and located at the ends of the side edge opposite the side edge joined to rear panel 10, are a pair of additional binding panels 22 which are also adapted to be bound into the spine of a magazine M, as seen in FIGS. 1 and 5.

As best been in FIG. 2, a pocket closure flap 24 is provided to close the pocket 15 after a compact disk has been inserted.

Pocket closure flap 24 is located between binding panels 22 and includes a first or detachable section 24a, having one edge detachably joined to rear panel 12 along a weakened line of tear 25a, and a second or glue section 24b detachably joined to an opposite edge of first section 24b along a weakened line of tear 25b. Second section 24b is adapted to be adhesively secured to a rear surface of rear panel 10, the adhesive area indicated at 27b.

After the insert holder IH has been formed and a compact disk inserted into the pocket 15, the closure tab 24 can be folded over and secured to the rear surface of rear panel 10.

The holder is then to be bound into the spine S of a magazine M, as seen in FIG. 1. This may be done in any one of several ways, such as by means of a line of hot melt adhesive (not shown).

In order to remove the holder from the magazine, to provide access to the compact disk, the holder front, rear, and advertising panels are detached from the binding panels, as illustrated in FIG. 5. The detachable section 24a of closure tab 24 can then be torn away and the compact disk removed from pocket 15. Also, the advertising panel 16 can be separated from rear panel 10 and used as a mailer if desired.

Figure 4E:
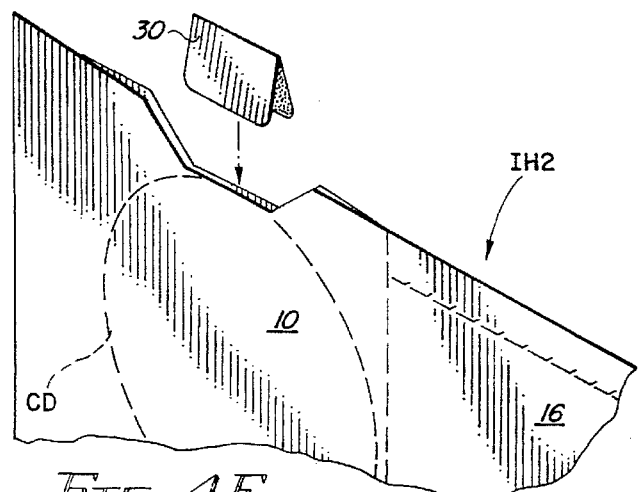
FIGS. 4E and 4F are views similar to that of FIG. 4D, but show a modified form of the invention.
Figure 4F:
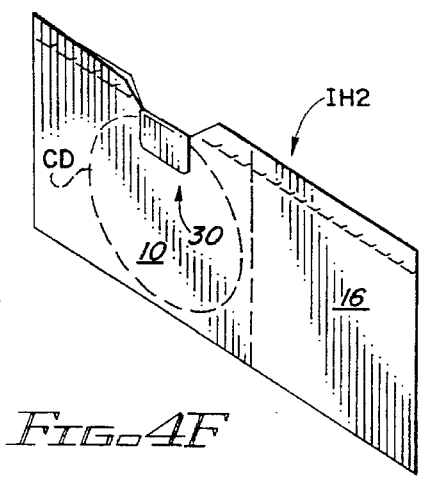

Turning now to FIG. 4E, it will be seen that a slightly modified form of the invention is shown. In this embodiment, IH1, the pocket closure flap 24 of the first described embodiment has been eliminated and replaced by a label-like patch 30 of paper or other material folded over corresponding edges of the front and rear panels and adhesively secured to both front and rear panels.

Another slightly modified form of the invention is illustrated in FIGS. 7–14. As best seen in FIG. 8, holder IH2 includes a rear panel 40, a front panel 42, and an advertising panel 46, all of which are preferably square and of substantially the same size.

The primary difference between the embodiment IH and the embodiment IH2 lies in the way in which the front, rear, and advertising panels are joined to each other and to the binding panel, and also in the way in which the binding panel is bound into the spine of a magazine, as described later herein.

Front panel 42 is foldably joined at a side edge to an adjacent side edge of rear panel 40, along a fold line 43, and is folded over 180 degrees on top of rear panel to form a pocket 45 for holding a compact disk CD as seen in FIGS. 9A–9E.

A pair of glue flaps 50 are foldably joined, along fold lines 51, to adjacent side edges of front panel 42. As best seen in FIGS. 9A–9E, glue flaps 50 are folded inwardly 180 degrees, on fold lines 51, and are adhesively secured to the front surface of rear panel 10. The adhesive patterns are indicated at 55a.

As best seen in FIG. 8, a pocket closure flap 52 is provided to close the pocket 45 after a compact disk has been inserted.

Pocket closure flap 52 includes a first section 52a, having one edge detachably joined to rear panel 42 along a weakened line of tear 53a, and a second or glue section 52b, detachably joined to another edge of first section 52a along a weakened line of tear 53b. Second section 52b is adapted to be adhesively secured to a rear surface of rear panel 40, the adhesive area identified at 55b.

After the insert holder IH2 has been formed and a compact disk inserted into the pocket 45, the closure tab 52 can be folded ever and secured to the rear surface of rear panel 40. The holder is then ready to be bound into the spine S of a magazine M.

As best seen in FIG. 8, there is provided a single binding panel 48 which is located between advertising panel 46 and rear panel 40 and detachably connected to each along a pair of spaced parallel weakened lines of tear 49.

A conventional binding machine BM, the details of which are not shown, may be employed to bind the insert holder IH2 into the spine S of a magazine by staples.

In order to remove the holder from the magazine, to provide access to the compact disk, the holder rear panel is detached from one side of the binding panel 48 by tearing along a line 49.

The detachable section 52a of closure tab 52 can then be torn away and the compact disk removed from pocket 45. Also, the advertising panel 46 can be detached from binder panel 48 in the same way and used as a mailer if desired.

What is claimed is:

1. A compact disk holder arranged and disposed to be bound into the spine of a magazine or other bound publication and be detachably removable therefrom, said holder being formed from a unitary blank of foldable paperboard, comprising:

(a) a generally rectangular rear panel having first, second, third, and fourth side edges;
   (b) a generally rectangular front panel having a first side edge foldably joined to said rear panel first side edge, having second and third side edges, and being disposed to overlie said rear panel and form therewith a pocket for holding a compact disk;
   (c) said front panel having foldably joined thereto, along opposed of said second and third side edges thereof, glue flaps folded inwardly and interposed between said front and rear panels and adhesively secured to said rear panel;
   (d) a pocket closure flap foldably joined to said front panel along a fourth side edge thereof, opposite said first side edge, and adapted to be folded over and secured to said rear panel to retain a compact disk in said pocket;
   (e) a generally rectangular advertising panel having a first side edge foldably joined to said rear panel second side edge and having a second side edge;
   (f) binding panels detachably joined along weakened lines of tear to said rear panel third side edge, to said front panel fourth side edge, and to said advertising panel second side edge, and adapted to be bound into a spine of a magazine or other bound publication.

2. A holder according to claim 1, wherein said pocket closure flap includes a first section, adapted to be adhesively secured to a rear surface of said rear panel, and a second section having opposed edges detachably joined to said front panel and said first section along parallel weakened lines of tear.

3. A compact disk holder arranged and disposed to be bound into the spine of a magazine or other bound publication and be detachably removable therefrom, said holder being formed from a unitary blank of foldable paperboard, comprising:

(a) a generally rectangular rear panel having first, second, third, and fourth side edges;
   (b) a generally rectangular front panel having a first side edge foldably joined to said rear panel first side edge, having second and third side edges, and being disposed to overlie said rear panel and form therewith a pocket for holding a compact disk;
   (c) said front panel having foldably joined thereto, along adjacent of said second and third side edges thereof, glue flaps folded inwardly and interposed between said front and rear panels and adhesively secured to said rear panel;

(d) a pocket closure flap foldably joined to said front panel fourth side edge and adapted to be folded over and secured to said rear panel to retain a compact disk in said pocket;

(e) a generally rectangular advertising panel having a first side edge;

(f) a binding panel having opposed side edges detachably joined along weakened lines of tear to said rear panel second side edge, and to said advertising panel first side edge, and adapted to be bound into a spine of a magazine or other bound publication;

(g) said front, rear, binding, and advertising panels being arranged in line with each other, wherein the lines of joining are parallel.

4. A holder according to claim 3, wherein said pocket closure flap includes a first section, adapted to be adhesively secured to a rear surface of said rear panel, and a second section having opposed edges detachably joined to said front panel and said first section along parallel weakened lines of tear.

5. A compact disk holder arranged and disposed to be bound into the spine of a magazine or other bound publication and be detachably removable therefrom, said holder being formed from a unitary blank of foldable paperboard, comprising:

(a) a generally rectangular rear panel having first, second, third, and fourth side edges;

(b) a generally rectangular front panel having one side edge foldably joined to one of said rear panel side edges, and being disposed to overlie said rear panel and form therewith a pocket for holding a compact disk;

(c) a pair of glue flaps foldably joined to said front panel along other of said front panel side edges and being folded inwardly and interposed between said front and rear panels and adhesively secured to said rear panel;

(d) a pocket closure member adapted to be folded over corresponding side edges of said front and rear panels and secured thereto to retain a compact disk in said pocket;

(e) a generally rectangular advertising panel;

(f) a binding panel detachably joined to said rear panel and to said advertising panel and adapted to be bound into a spine of a magazine or other bound publication;

(g) said front, rear, binding, and advertising panels being arranged in line with each other and being joined to each other along parallel fold lines.

6. A holder according to claim 5, wherein said other side edges are adjacent side edges of said front panel.

7. A holder according to claim 5, wherein said pocket closure member is a patch of material separate from said blank and is adapted to be adhesively secured to front and rear surfaces of said front and rear panels, respectively.

8. A holder according to claim 3, wherein said pocket closure member includes a first section, adapted to be adhesively secured to a rear surface of said rear panel, and a second section having opposed edges detachably joined to said front panel and said first section along parallel weakened lines of tear.

9. A holder according to claim 5, wherein the joining between each of said advertising panel and said rear panel with said binding panel is along weakened lines of tear.

10. A holder according to claim 5, wherein said binding panel lies between said advertising and rear panels, and wherein the joining of said binding panel to said advertising panel and said rear panel is along parallel lines of weakness spaced from each other.

11. A holder according to claim 5, wherein the joining between the advertising panel and the rear panel is adapted to be detached.

* * * * *